June 7, 1960 K. WILFERT 2,940,064
ELECTRICAL EQUIPMENT OF VEHICLES, PARTICULARLY MOTOR VEHICLES
Filed May 17, 1956
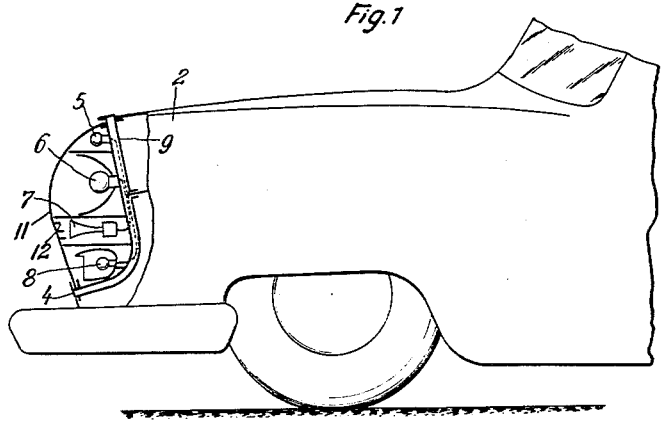
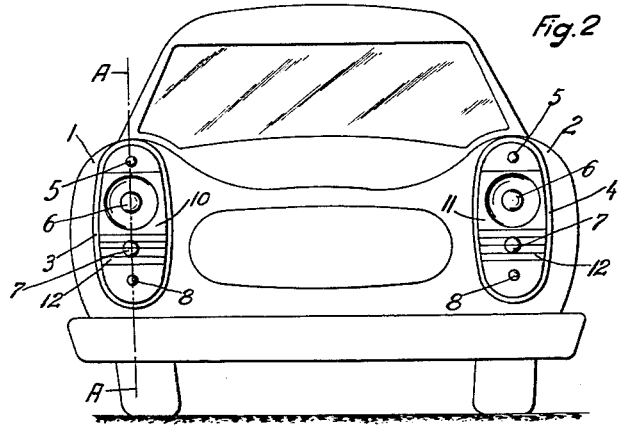
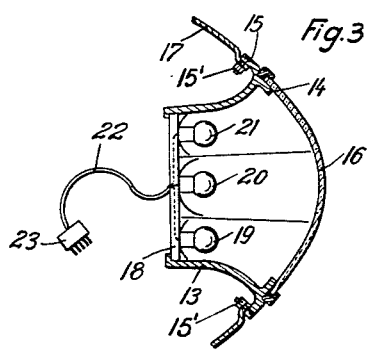
Inventor
KARL WILFERT
BY Dicke and Craig
ATTORNEYS

# United States Patent Office 2,940,064
Patented June 7, 1960

2,940,064

ELECTRICAL EQUIPMENT OF VEHICLES, PARTICULARLY MOTOR VEHICLES

Karl Wilfert, Stuttgart-Degerloch, Germany, assignor to Daimler-Benz Aktiengesellschaft, Stuttgart-Untertürkheim, Germany Filed May 17, 1956, Ser. No. 585,549

Claims priority, application Germany May 18, 1955

4 Claims. (Cl. 340—88)

My invention relates to the electrical equipment of vehicles, particularly motor vehicles, with lamps, headlights, horns, etc.

The conventional mounting of such electrical equipment is impractical with respect to the assembly and repairs because the various fixtures, such as the lamps, the headlights, the horn etc., are separately installed in the vehicle body requiring the provision therein of a multiplicity of apertures or recesses and thus requiring time consuming manual work in assembling the various fixtures and the equipment of the body with a great number of electrical conductors leading to the different fixtures.

It is the object of the present invention to simplify the electrical equipment and to provide improved mounting means for the various fixtures. Further objects of my invention will appear from a detailed description following hereinafter of two preferred embodiments thereof illustrated in the accompanying drawings. It is to be understood, however, that the terms and phrases used in such detailed description have been chosen for the purpose of illustrating the invention rather than that of restricting or limiting the same.

In the drawings,

Fig. 1 is a side view of the front end of a motor car provided with the improved mounting means for the electrical fixtures, Fig. 2 is a front view of the motor car shown in Fig. 1 and Fig. 3 is a sectional view of the dome-shaped end portion of a vehicle body constituting another embodiment of the present invention.

The vehicle body of the motor car shown in Fig. 1 is provided with two front fenders or wheel housings 1 and 2, each formed with a forwardly directed dome-shaped end portion. For the purpose of the present invention this end portion is formed by a transparent hood 10, or 11 respectively, and by the adjoining wall portions of the wheel housing. These wall portions are disposed flush with the marginal portions of the hood, as will appear from Fig. 1. A support 3, or 4 respectively, is interposed between the hood 10, or 11 respectively, and the wall portions of the wheel housing, the hood 10, or 11 respectively, being exclusively carried by the support. Each of the supports 3 and 4 carries a blinker lamp 5 indicating the driver's intention to make a turn, a headlight 6, an electrical horn 7, and a lamp 8 constituting a fog light. These electrical fixtures are mounted on a plate 9 forming part of the support. The transparent hood 10, or 11 respectively, may be provided with suitable apertures, such as slots, registering with the horn 7 for emission of the sound. The shape of the hood and the apertures therein is so chosen that the entire dome-shaped end portion of the wheel housing will harmonize with the shape of the vehicle body.

Preferably, the support and the hood are symmetrically shaped with respect to a vertical central plane, such as the plane A—A indicated in Fig. 2. This has the advantage that the two supports 3 and 4 may be shaped identical and may be exchanged, if desired.

In Fig. 3 there is shown another embodiment of the present invention. As in Fig. 1, in this embodiment the vehicle has a dome-shaped end portion formed by a transparent hood 16 and by adjoining wall portions 17 disposed flush with the marginal portions of the hood. The support 13 interposed between the hood 16 and the wall portions 17 is preferably provided with an outer peripheral flange 15 lying flush with the hood 16 and the wall portions 17, and with an inner peripheral flange 14 which carries the hood 16. The flanges 14 and 15 may be integral with the supporting frame 13. This embodiment of the invention is particularly adapted to constitute the rear portions of the body. The transparent hood 16 may be held in engagement with the flange 14 by any suitable means of attachment, such as gibs and screws, in a manner not shown in detail, whereby the hood may be sealed against the support 13. The flange 15 is secured to the wall portions 17 in a releasable manner by conventional means such as, for instance, bolts 15'. In this manner, the flange 15 carries the entire supporting structure, the latter again carrying the hood 16. Hence, it will appear that the wall portion 17, the flange 15 and the marginal portions of the hood 16 form a smooth outer surface free from any steps thus reducing air resistance and facilitating the washing of the car. If desired, a separate frame 18 may be secured to the supporting structure 13 to carry the various fixtures, such as a blinker light 19, a tail light 20 and a brake light 21. The individual electrical conductors leading to the various electrical fixtures are preferably combined in a single cable 22 carrying a plug 23 adapted to cooperate with a socket provided on the body of the vehicle. Preferably, the plug 23 and the socket are of a type permitting engagement in a single position only thus precluding false connections of the various fixtures. If desired, other fixtures, such as a parking light and a light for illuminating the license plate, may be likewise mounted on the frame 18.

From the above detailed description it will appear that the subject matter of my invention is a mounting system for the electrical fixtures, such as lamps, headlights, signalling devices, etc. in vehicles, particularly motor vehicles, in which all of the electrical equipments to be provided on an end portion of the motor vehicle are carried by a common support adapted to be easily attached to or detached from the vehicle body. Preferably, this support carrying the various electrical fixtures is rigidly connected with the transparent hood which may be subdivided if desired and may be provided with suitable apertures, the shape of such hood conforming to the shape of the body. Preferably, the electrical connection of all of the electrical fixtures mounted on the support to a source of current is effected by a multi-polar plug.

The novel fixture supporting system enables all of the electrical fixtures to be mounted on the respective end of the vehicle to be assembled in a prefabricated unit. This unit is capable of attachment to the vehicle in a minimum of time. Moreover, the electrical connections are considerably simplified by the provision of but a single multipolar cable for all of the various fixtures mounted on the common support, such cable being capable of being connected up by a simple plug-and-socket connection precluding the risk of faulty connections.

According to another feature of the present invention the car body and the transparent hood are connected by an outer peripheral flange and an inner peripheral flange of the support, the inner flange serving to secure the hood to the support, and the outer flange serving to secure the support to the vehicle body. If desired, the support may be formed by an integral frame.

The present invention permits the support to be rapidly attached to or detached from the body of the vehicle and also permits the various electrical fixtures to be easily exchanged after the transparent hood has been removed from the support.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle, the combination comprising a vehicle body having an opening, a dome-shaped end portion formed by a transparent hood and by adjoining wall portions disposed flush with the marginal portions of said opening, a support interposed between said hood and said wall portions, said hood being mounted on said support, a plurality of electrical fixtures including at least a blinker lamp, a headlight, an electric horn, a fog light, mounting means for said fixtures and electrical connections therefor combined into a multiple wire cable also mounted on said support to form together with said hood an independent and self-contained unit assembly for easy mounting and dismounting said unit assembly to and from said vehicle.

2. The combination claimed in claim 1, wherein said support includes a peripheral flange lying flush with said hood and said wall portions.

3. The combination as claimed in claim 1, wherein said support includes an outer peripheral flange lying flush with said hood and said wall portions, and an inner peripheral flange carrying said hood.

4. The combination as claimed in claim 1, wherein said cable includes a multiple prong plug, said vehicle body being provided with a multiple connector socket for cooperation with said plug.

References Cited in the file of this patent

UNITED STATES PATENTS

| | | |
|---|---|---|
| 1,613,175 | Lawson | Jan. 4, 1927 |
| 1,730,325 | Howe | Oct. 1, 1929 |
| 2,128,679 | Kielian | Aug. 30, 1938 |
| 2,281,643 | Wahlberg | May 5, 1942 |
| 2,465,248 | McCandless | Mar. 22, 1949 |
| 2,538,146 | Compton | Jan. 16, 1951 |
| 2,549,124 | Oswald | Apr. 17, 1951 |